US011182331B2

(12) United States Patent
Sekiya

(10) Patent No.: US 11,182,331 B2
(45) Date of Patent: Nov. 23, 2021

(54) COMMUNICATION SYSTEM AND COMMUNICATION UNIT

(71) Applicant: Sony Semiconductor Solutions Corporation, Kanagawa (JP)

(72) Inventor: Akito Sekiya, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 16/959,510

(22) PCT Filed: Nov. 1, 2018

(86) PCT No.: PCT/JP2018/040708
§ 371 (c)(1),
(2) Date: Jul. 1, 2020

(87) PCT Pub. No.: WO2019/138665
PCT Pub. Date: Jul. 18, 2019

(65) Prior Publication Data
US 2021/0056068 A1 Feb. 25, 2021

(30) Foreign Application Priority Data

Jan. 11, 2018 (JP) .............................. JP2018-002796

(51) Int. Cl.
*G06F 13/42* (2006.01)
(52) U.S. Cl.
CPC .. *G06F 13/4282* (2013.01); *G06F 2213/0016* (2013.01)
(58) Field of Classification Search
CPC .................................................. G06F 13/4282
See application file for complete search history.

(56) References Cited

U.S. PATENT DOCUMENTS

| 4,618,965 A | 10/1986 | Maxwell et al. |
| 2011/0206355 A1* | 8/2011 | Toba ................. H04N 21/2541 386/355 |

(Continued)

FOREIGN PATENT DOCUMENTS

| JP | 02-023728 A | 1/1990 |
| JP | 06-125259 A | 5/1994 |
| JP | 08-237761 A | 9/1996 |

OTHER PUBLICATIONS

"UM10204 I2C—bus specification and user manual." [online], NXP Semiconductors, Rev.6 ?Apr. 4, 2014, [Searched on Dec. 23, 2017], Internet <URL: https://www.nxp.com/docs/en/user-guide/UM10204.pdf> .

*Primary Examiner* — Henry Tsai
*Assistant Examiner* — Dean Phan
(74) *Attorney, Agent, or Firm* — Michael Best & Friedrich LLP

(57) ABSTRACT

A communication system according to the present disclosure includes a first communication unit that includes a first terminal, a transmission circuit configured to transmit a clock signal via the first terminal, a first resistor inserted into a path between the first terminal and a power supply, a first switch configured to couple the power supply and the first terminal to each other by being turned on, and a first controller configured to control an operation of the first switch, and a second communication unit that includes a second terminal coupled to the first terminal of the first communication unit via a first wiring line, a reception circuit configured to receive the clock signal via the second terminal, a power storage device, a second switch configured to couple the second terminal and the power storage device to each other by being turned on, and a second controller configured to control an operation of the second switch, the second communication unit being configured to operate by (Continued)

supply of a voltage of the power storage device as a power supply voltage.

13 Claims, 8 Drawing Sheets

(56) References Cited

U.S. PATENT DOCUMENTS

| | | | | |
|---|---|---|---|---|
| 2012/0001740 A1* | 1/2012 | Doi | ............................ | H02J 1/06 |
| | | | | 340/12.32 |
| 2012/0080954 A1* | 4/2012 | Gachon | ..................... | G06F 3/14 |
| | | | | 307/80 |
| 2014/0001884 A1* | 1/2014 | Doi | ............................ | H02J 4/00 |
| | | | | 307/115 |

* cited by examiner

[FIG. 1]
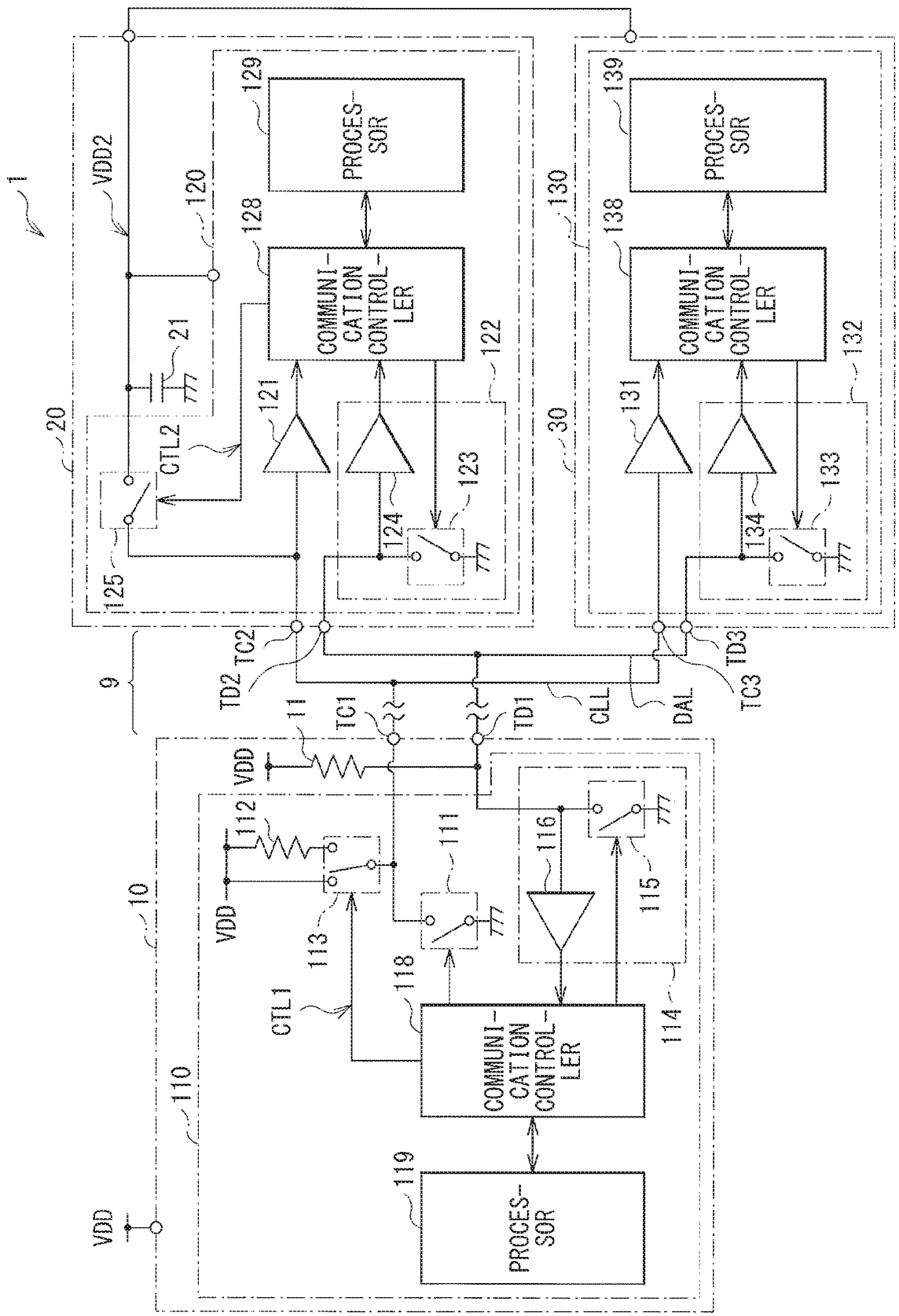

[FIG. 2]
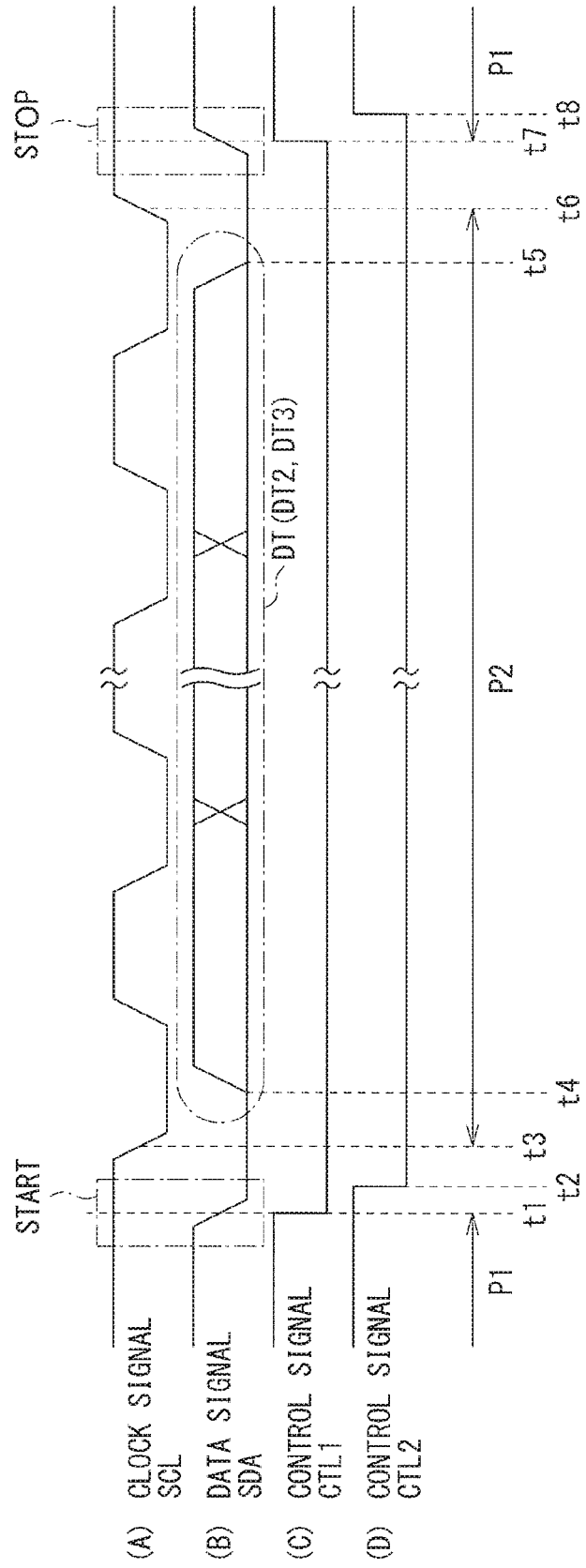

[FIG. 3]
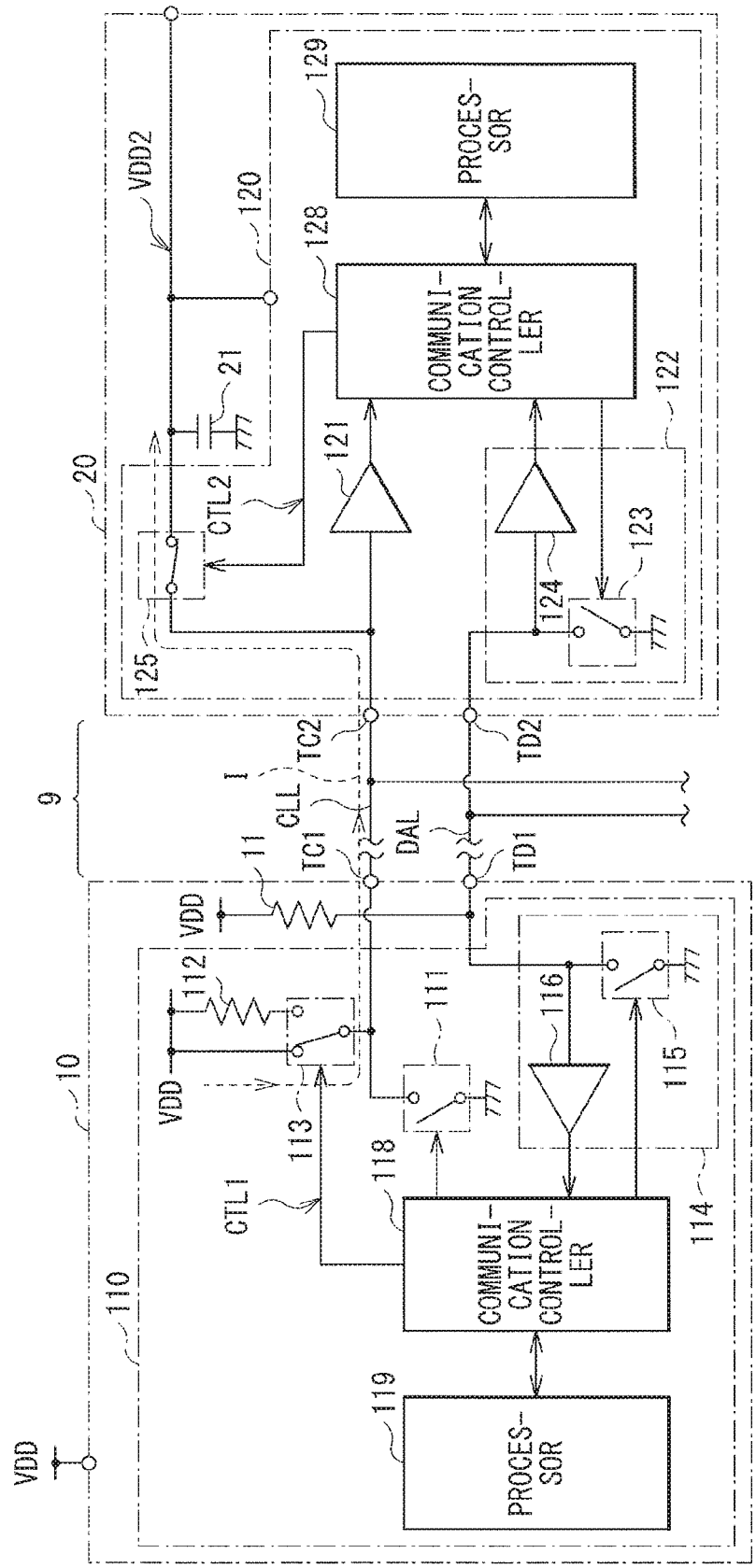

[FIG. 4]
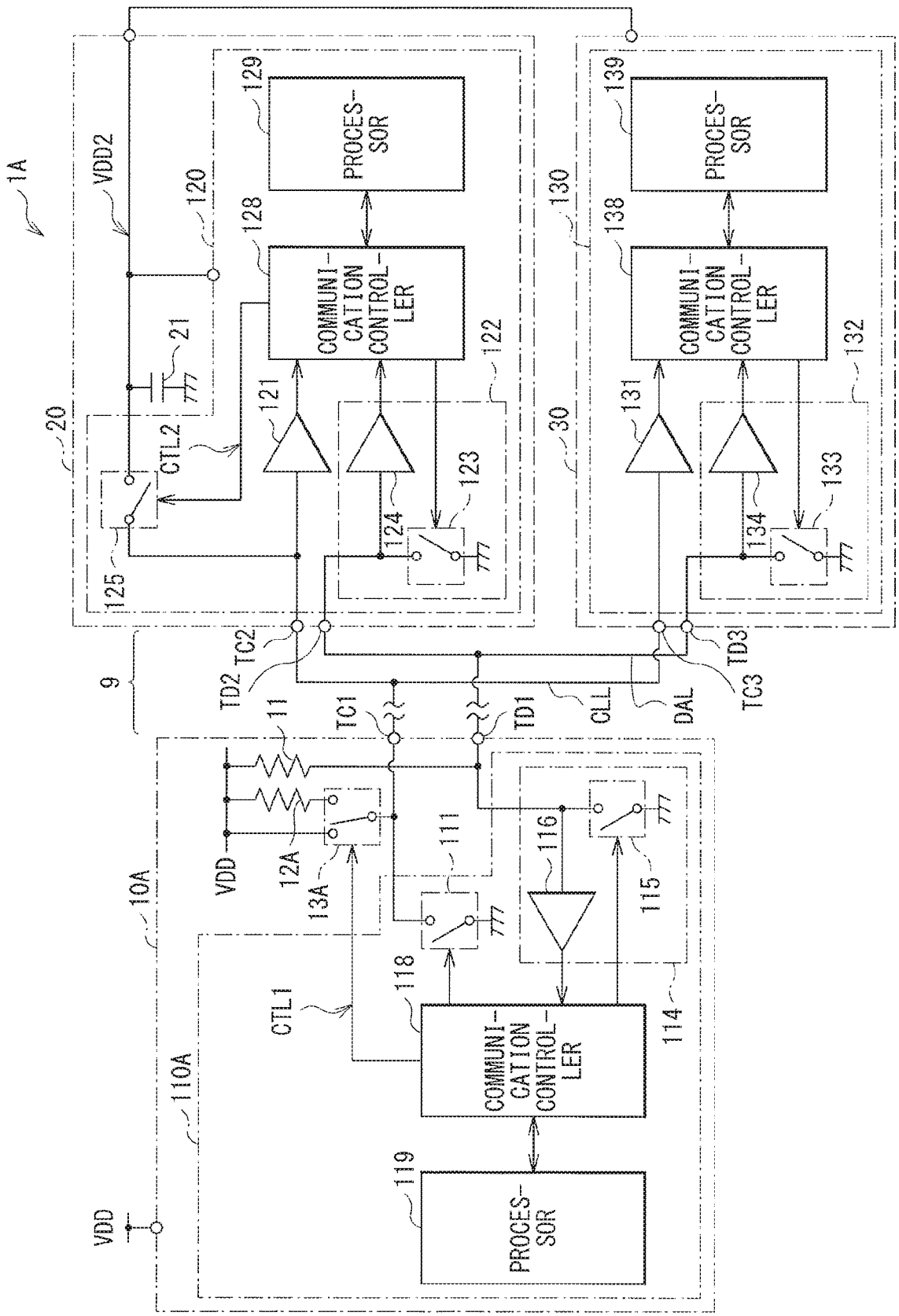

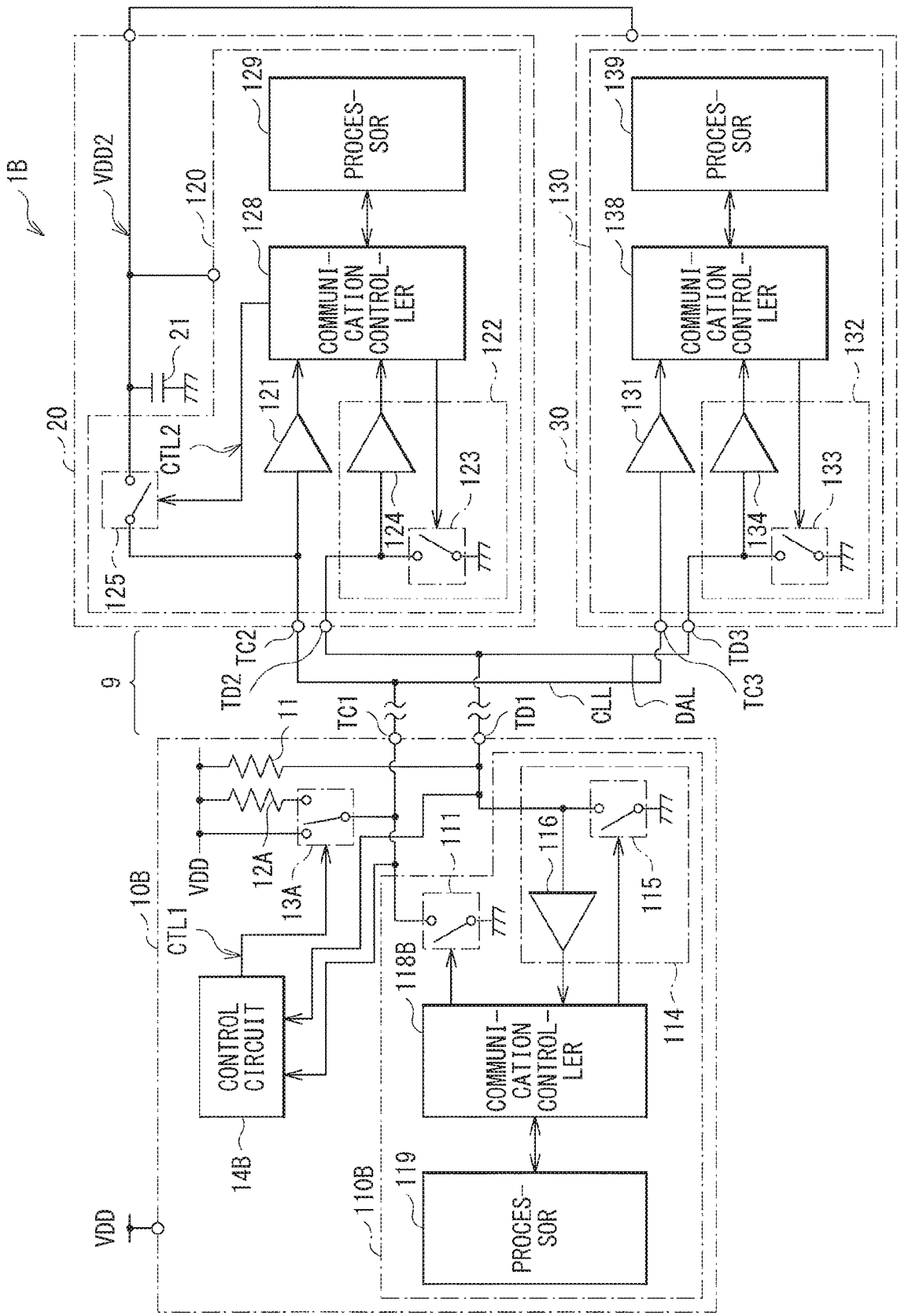
[FIG. 5]

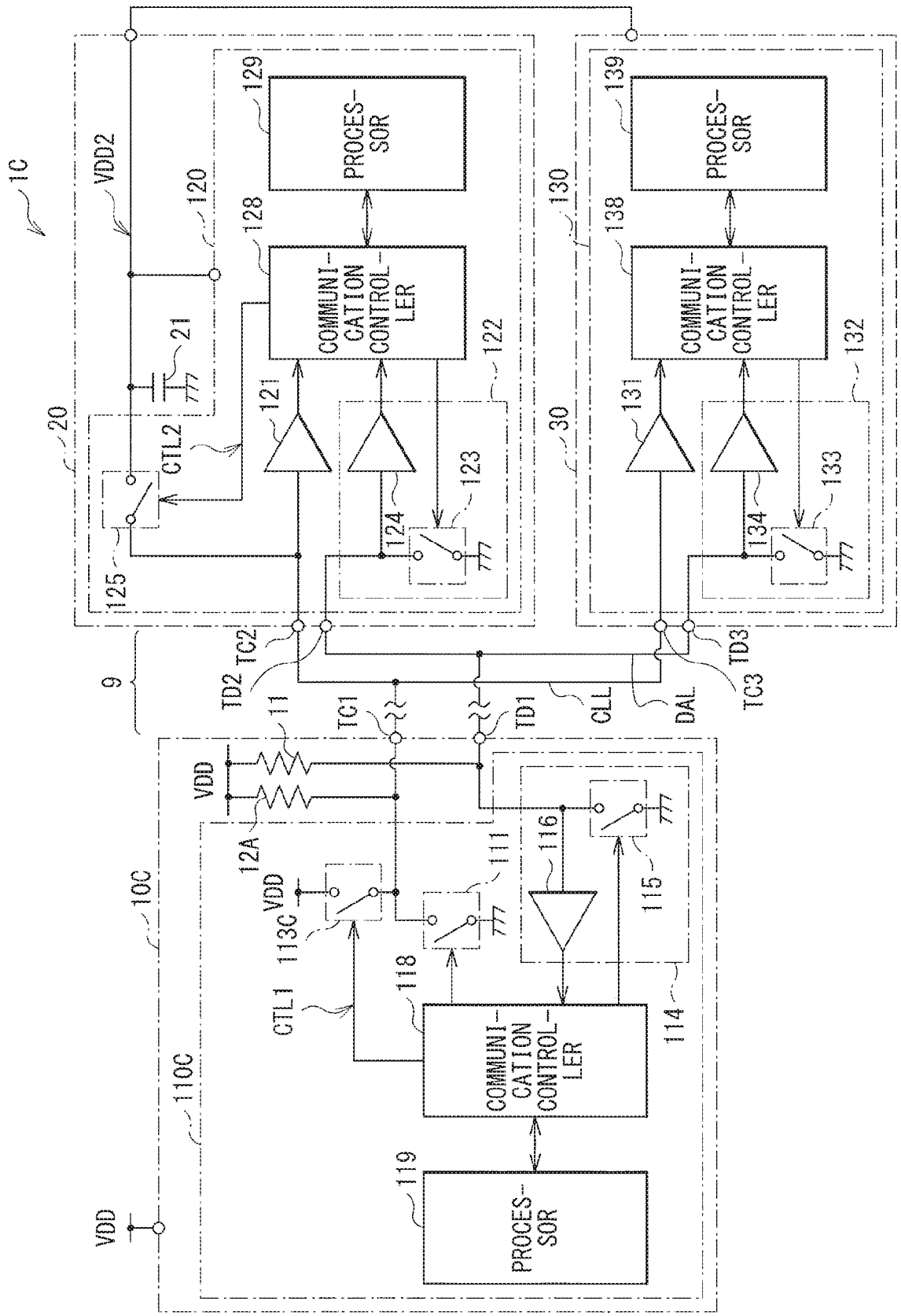
[FIG. 6]

[FIG. 7]
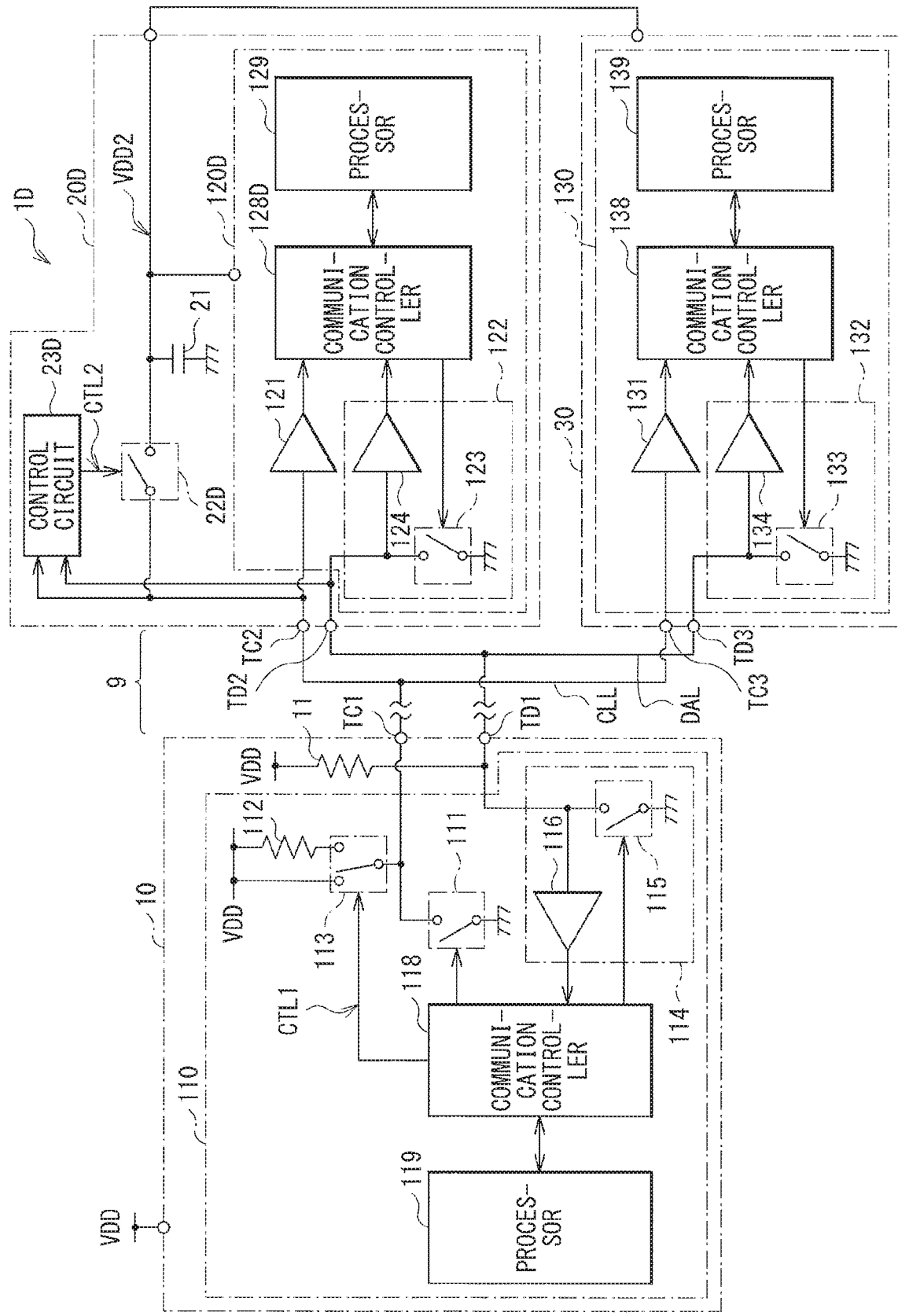

[FIG. 8]
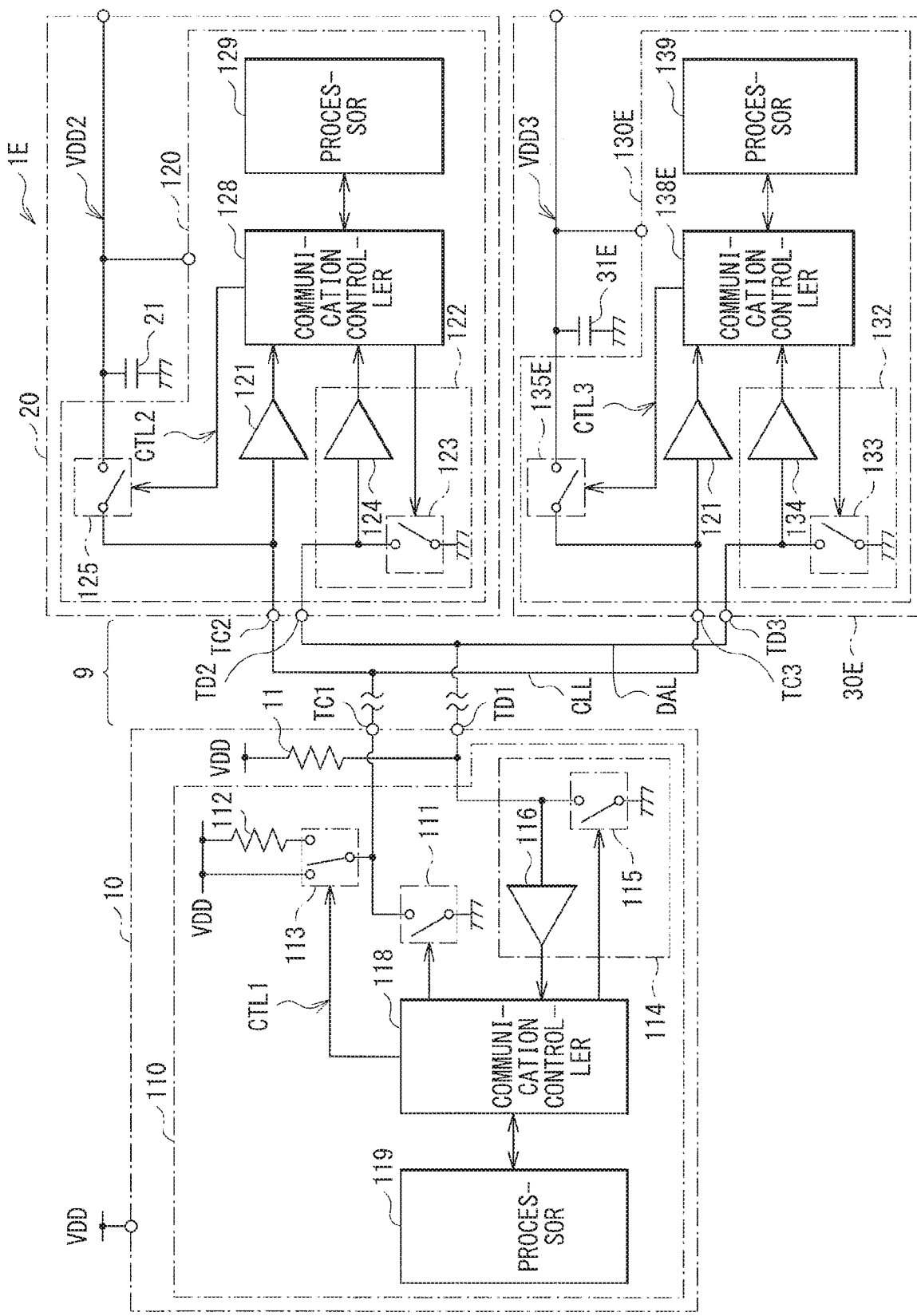

COMMUNICATION SYSTEM AND COMMUNICATION UNIT

TECHNICAL FIELD

The present disclosure relates to a communication system that transmits and receives a signal and a communication unit used in such a communication system.

BACKGROUND ART

In an electronic apparatus, a plurality of devices often exchanges information. For example, Non-Patent Literature 1 discloses a serial bus (an $I^2C$ bus) that is pulled up by using a resistor and is able to perform bidirectional communication.

CITATION LIST

Non-Patent Literature

NPL 1: "UM10204 I2C-bus specification and user manual." [online], NXP Semiconductors, Rev. 6 ?4 Apr. 2014, [Searched on Dec. 23, 2017], Internet <URL: https://www.nxp.com/docs/en/user-guide/UM10204.pdf>

SUMMARY OF THE INVENTION

Regarding communication between a plurality of devices, it is desired that the number of wiring lines be small, and further reduction in the number of wiring lines is expected.

It is desirable to provide a communication system and a communication unit that are able to reduce the number of wiring lines.

A communication system according to an embodiment of the present disclosure includes a first communication unit and a second communication unit. The first communication unit includes a first terminal, a transmission circuit configured to transmit a clock signal via the first terminal, a first resistor inserted into a path between the first terminal and a power supply, a first switch configured to couple the power supply and the first terminal to each other by being turned on, and a first controller configured to control an operation of the first switch. The second communication unit includes a second terminal coupled to the first terminal of the first communication unit via a first wiring line, a reception circuit configured to receive a clock signal via the second terminal, a power storage device, a second switch configured to couple the second terminal and the power storage device to each other by being turned on, and a second controller configured to control an operation of the second switch, the second communication unit being configured to operate by supply of a voltage of the power storage device as a power supply voltage.

A communication unit according to an embodiment of the present disclosure includes a first terminal, a transmission circuit, a first resistor, a first switch, and a first controller. The transmission circuit is configured to transmit a clock signal via the first terminal. The first resistor is inserted into a path between the first terminal and a power supply. The first switch is configured to couple the power supply and the first terminal to each other by being turned on. The first controller is configured to control an operation of the first switch.

In the communication system according to the embodiment of the present disclosure, the first resistor is provided in the path between the first terminal and the power supply.

Then, the clock signal is transmitted from the transmission circuit of the first communication via the first terminal, and the clock signal is received by the reception circuit of the second communication unit via the second terminal. The first communication unit is provided with the first switch configured to couple the power supply and the first terminal to each other. The first switch is controlled by the first controller. The second communication unit is provided with the second switch configured to couple the second terminal and the power storage device to each other. The second switch is controlled by the second controller. The voltage of the power storage device is supplied to the second communication unit as the power supply voltage.

The communication system and the communication unit according to the respective embodiments of the present disclosure are each provided with the first switch configured to couple the power supply and the first terminal to each other by being turned on, which makes it possible to reduce the number of wiring lines. Note that the effects described here are non-limiting, and any effect described in the present disclosure may be achieved.

BRIEF DESCRIPTION OF DRAWING

FIG. 1 is a block diagram illustrating an exemplary configuration of a communication system according to an embodiment of the present disclosure.

FIG. 2 is a timing waveform chart illustrating an exemplary operation of the communication system illustrated in FIG. 1.

FIG. 3 is an explanatory diagram illustrating an exemplary power supply operation of the communication system illustrated in FIG. 1.

FIG. 4 is a block diagram illustrating an exemplary configuration of a communication system according to a modification example.

FIG. 5 is a block diagram illustrating an exemplary configuration of a communication system according to another modification example.

FIG. 6 is a block diagram illustrating an exemplary configuration of a communication system according to still another modification example.

FIG. 7 is a block diagram illustrating an exemplary configuration of a communication system according to yet another modification example.

FIG. 8 is a block diagram illustrating an exemplary configuration of a communication system according to still yet another modification example.

MODES FOR CARRYING OUT THE INVENTION

Hereinafter, an embodiment of the present disclosure will be described in detail with reference to the drawings.

Embodiment

[Exemplary Configuration]

FIG. 1 illustrates an exemplary configuration of a communication system (a communication system 1) according to an embodiment. It is possible for the communication system 1 to bidirectionally transmit and receive data by using a serial bus. The communication system 1 includes communication units 10, 20, and 30 and a bus 9. The communication unit 10 includes a clock terminal TC1 and a data terminal TD1. The communication unit 20 includes a clock terminal TC2 and a data terminal TD2. The communication unit 30 includes a clock terminal TC3 and a data terminal TD3. The bus 9 is an I²C bus and includes a clock signal line CLL and a data signal line DAL. The clock signal line CLL transmits a clock signal SCL and is coupled to the clock terminal TC1 of the communication unit 10, the clock terminal TC2 of the communication unit 20, and the clock terminal TC3 of the communication unit 30. The data signal line DAL transmits a data signal SDA and is coupled to the data terminal TD1 of the communication unit 10, the data terminal TD2 of the communication unit 20, and the data terminal TD3 of the communication unit 30. A bit rate of the data signal SDA is, for example, about several hundreds of kbps to several Mbps.

(Communication Unit 10)

The communication unit 10 communicates with the communication units 20 and 30 and functions as a master device in the communication system 1. The communication unit 10 operates on the basis of a power supply voltage VDD supplied from outside. The communication unit 10 includes a resistor 11 and a semiconductor circuit 110.

The resistor 11 functions as a pull-up resistor of the data signal line DAL. One end of the resistor 11 is supplied with the power supply voltage VDD, and another end thereof is coupled to the data terminal TD1. The resistor 11 includes, for example, a chip resistor. A resistance value of the resistor 11 is, for example, about several kΩ.

The semiconductor circuit 110 transmits the clock signal SCL to the communication units 20 and 30 and transmits and receives the data signal SDA to and from the communication units 20 and 30. The semiconductor circuit 110 includes, for example, a semiconductor chip. The semiconductor circuit 110 includes a switch 111, a resistor 112, a switch 113, a communication circuit 114, a communication controller 118, and a processor 119.

The switch 111 generates the clock signal SCL on the basis of a signal supplied from the communication controller 118. One end of the switch 111 is coupled to the switch 113 and the clock terminal TC1, and another end thereof is grounded. The switch 111 includes, for example, an N-type MOS (Metal Oxide Semiconductor) transistor. The one end of the switch 111 may be coupled to the resistor 112 via the switch 113. In a case where the switch 111 couples the clock terminal TC1 to another end of the resistor 112, the clock signal line CLL is pulled up by using the resistor 112. Therefore, the communication unit 10 sets the clock signal SCL to a low level in a case where the switch 111 is in an on state, and sets the clock signal SCL to a high level in a case where the switch 111 is in an off state. In this way, the switch 111 generates the clock signal SCL.

The resistor 112 functions as a pull-up resistor of the clock signal line CLL. One end of the resistor 112 is supplied with the power supply voltage VDD, and the other end thereof may be coupled to the clock terminal TC1 via the switch 113. A resistance value of the resistor 112 is, for example, about several kΩ.

The switch 113 selectively couples the clock terminal TC1 to the other end of the resistor 112 or a power line that supplies the power supply voltage VDD, on the basis of a control signal CTL1 supplied from the communication controller 118. The switch 113 includes, for example, a P-type MOS transistor.

The communication circuit 114 transmits and receives the data signal SDA. The communication circuit 114 includes a switch 115 and a reception circuit 116.

The switch 115 generates the data signal SDA on the basis of a signal supplied from the communication controller 118. One end of the switch 115 is coupled to the other end of the resistor 11 and the data terminal TD1, and another end thereof is grounded. The switch 115 includes, for example, an N-type MOS transistor. The data signal line DAL is pulled up by using the resistor 11. Therefore, in a case of transmitting data, the communication unit 10 sets the data signal SDA to a low level by turning on the switch 115 and sets the data signal SDA to a high level by filming off the switch 115. In this way, the switch 115 generates the data signal SDA.

The reception circuit 116 receives the data signal SDA. An input terminal of the reception circuit 116 is coupled to the other end of the resistor 11 and the data terminal TD1, and an output terminal is coupled to the communication controller 118.

The communication controller 118 controls a communication operation of the communication unit 10. Specifically, in a case where the communication system 1 performs communication, the communication controller 118 couples the clock terminal TC1 to the other end of the resistor 112 by supplying the control signal CTL1 to the switch 113 and makes the switch 111 generate the clock signal SCL by supplying a signal corresponding to the clock signal SCL to the switch 111. In a case where the communication unit 10 transmits the data signal SDA, the communication controller 118 makes the switch 115 venerate the data signal SDA by supplying a signal corresponding to the data signal SDA to the switch 115. In a case where the communication unit 10 receives the data signal SDA, the communication controller 118 turns off the switch 115 and makes the reception circuit 116 receive the data signal SDA. On the other hand, in a case where the communication system 1 does not perform communication, by supplying the control signal CTL1 to the switch 113, the communication controller 118 couples the clock terminal TC1 to the power line that supplies the power supply voltage VDD, and turns off the switches 111 and 115.

The processor 119 performs various processes by using data exchanged in the communication system 1.

(Communication Unit 20)

The communication unit 20 communicates with the communication unit 10 and functions as a. slave device in the communication system 1. The communication unit 20 operates on the basis of electric power supplied from the communication unit 10 via the clock signal line CLL. The communication unit 20 includes a semiconductor circuit 120 and a capacitor 21.

The semiconductor circuit 120 receives the clock signal SCL transmitted from the communication unit 10 and transmits and receives the data signal SDA to and from the communication unit 10. The semiconductor circuit 120 includes, for example, a semiconductor chip. The semiconductor circuit 120 includes a reception circuit 121, a communication circuit 122, a switch 125, a communication controller 128, and a processor 129.

The reception circuit 121 receives the clock signal SCL. An input terminal of the reception circuit 121 is coupled to the clock terminal TC2 and the switch 125, and an output terminal thereof is coupled to the communication controller 128.

The communication circuit 122 transmits and receives the data signal SDA. The communication circuit 122 includes a switch 123 and a reception circuit 124.

The switch 123 generates the data signal SDA on the basis of a signal supplied from the communication controller 128. One end of the switch 123 is coupled to the data terminal TD2, and another end thereof is grounded. The switch 123 includes, for example, an N-type MOS transistor. The data signal line DAL is pulled up by using the resistor 11 in the communication unit 10. Therefore, in a case of transmitting data, the communication unit 20 sets the data signal SDA to the low level by turning on the switch 123 and sets the data signal SDA to the high level by turning off the switch 123. In this way, the switch 123 generates the data signal SDA.

The reception circuit 124 receives the data signal SDA. An input terminal of the reception circuit 124 is coupled to the data terminal TD2, and an output terminal thereof is coupled to the communication controller 128.

The switch 125 couples the clock terminal TC2 to the capacitor 21 on the basis of a control signal CTL2 supplied from the communication controller 128. One end of the switch 125 is coupled to the clock terminal TC2, and another end thereof is coupled to one end of the capacitor 21. The switch 125 includes, for example, a P-type MOS transistor.

The communication controller 128 controls a communication operation of the communication unit 20. Specifically, in a case where the communication system 1 performs communication, the communication controller 128 turns off the switch 125 by supplying the control signal CTL2 to the switch 125 and makes the reception circuit 121 receive the clock signal SCL. In a case where the communication unit 20 receives the data signal SDA, the communication controller 128 makes the reception circuit 124 receive the data signal SDA by turning off the switch 123. In a case where the communication unit 20 transmits the data signal SDA, the communication controller 128 makes the switch 123 generate the data signal SDA by supplying a signal corresponding to the data signal SDA to the switch 123. On the other hand, in a case where the communication system 1 does not perform communication, the communication controller 128 aims on the switch 125 by supplying the control signal CTL2 to the switch 125 and turns off the switch 123. This configuration makes it possible for the communication system 1 to charge the capacitor 21 during a period in which communication is not performed, by supplying the power supply voltage VDD, which is supplied from the communication unit 10 via the clock signal line CLL, to the capacitor 21 via the switch 125.

The processor 129 performs various processes by using data exchanged in the communication system 1.

The capacitor 21 accumulates electric power supplied from the communication unit 10 via the switch 125. The one end of the capacitor 21 is coupled to the switch 125, and another end thereof is grounded. A voltage at the one end of the capacitor 21 is supplied to the semiconductor circuit 120 and also supplied to the communication unit 30 as a power supply voltage VDD2. As the capacitor 21, it is possible to use a capacitor of, for example, several hundreds of μF or more. It is possible to configure the capacitor 21 by using, for example, an electric dual layer capacitor (that is, a super capacitor).

(Communication Unit 30)

The communication unit 30 communicates with the communication unit 10 and functions as a slave device in the communication system 1. In this example, the communication unit 30 is disposed near the communication unit 20. The communication unit 30 operates on the basis of electric power supplied from the communication unit 20. The communication unit 30 includes a semiconductor circuit 130.

The semiconductor circuit 130 receives the clock signal SCL transmitted from the communication unit 10 and transmits and receives the data signal SDA to and from the communication unit 10. The semiconductor circuit 130 includes, for example, a semiconductor chip. The semiconductor circuit 130 includes a reception circuit 131, a communication circuit 132, a communication controller 138, and a processor 139.

The reception circuit 131 receives the clock signal SCL. An input terminal of the reception circuit 131 is coupled to the clock terminal TC3, and an output terminal thereof is coupled to the communication controller 138.

The communication circuit 132 transmits and receives the data signal SDA. The communication circuit 132 includes a switch 133 and a reception circuit 134.

The switch 133 generates the data signal SDA on the basis of a signal supplied from the communication controller 138. One end of the switch 133 is coupled to the data terminal TD3, and another end thereof is grounded. The switch 133 includes, for example, an N-type MOS transistor. The data signal line DAL is pulled up by using the resistor 11 in the communication unit 10. Therefore, in a case of transmitting data, the communication unit 30 sets the data signal SDA to the low level by turning on the switch 133 and sets the data signal SDA to the high level by turning off the switch 133. In this way, the switch 133 generates the data signal SDA.

The reception circuit 134 receives the data signal SDA. An input terminal of the reception circuit 134 is coupled to the data terminal TD3, and an output terminal thereof is coupled to the communication controller 138.

The communication controller 138 controls a communication operation of the communication unit 30. Specifically, in a case where the communication system 1 performs communication, the communication controller 138 makes the reception circuit 131 receive the clock signal SCL. In a case where the communication unit 30 receives the data signal SDA, the communication controller 138 turns off the switch 133 and makes the reception circuit 134 receive the data signal SDA. In a case where the communication unit 30 transmits the data signal SDA, the communication controller 138 makes the switch 133 generate the data signal SDA by supplying a signal corresponding to the data signal SDA to the switch 133. On the other hand, in a case where the communication system 1 does not perform communication, the communication controller 138 turns off the switch 133.

The processor 139 performs various processes by using data exchanged in the communication system 1.

Here, the communication unit 10 corresponds to a specific example of "a first communication unit" of the present disclosure. The terminal TC1 corresponds to a specific example of "a first terminal" of the present disclosure. The terminal TD1 corresponds to a specific example of "a third terminal" of the present disclosure. The switch 111 corresponds to a specific example of "a transmission circuit" of the present disclosure. The communication circuit 114 corresponds to a specific example of "a first communication circuit" of the present disclosure. The resistor 112 corresponds to a specific example of "a first resistor" of the present disclosure. The resistor 11 corresponds to a specific example of "a second resistor" of the present disclosure. The communication controller 118 corresponds to a specific example of "a first controller" of the present disclosure. The communication unit 20 corresponds to a specific example of "a second communication unit" of the present disclosure. The terminal TC2 corresponds to a specific example of "a second terminal" of the present disclosure. The terminal TD2 corresponds to a specific example of "a fourth terminal" of the present disclosure. The reception circuit 121 corresponds to a specific example of "a reception circuit" of the present disclosure. The communication circuit 122 corresponds to a specific example of "a second communication circuit" of the present disclosure. The switch 125 corresponds to a specific example of "a second switch" of the present disclosure. The capacitor 21 corresponds to a specific example of "a power storage device" of the present disclosure. The communication controller 128 corresponds to a specific example of "a second controller" of the present disclosure.

[Operation and Workings]

Subsequently, an operation and workings of the communication system 1 according to the present embodiment will be described.

(Summary of Overall Operation)

First, a summary of an overall operation of the communication system 1 will be described with reference to FIG. 1. The semiconductor circuit 110 of the communication unit 10 transmits the clock signal SCL to the communication units 20 and 30 and transmits and receives the data signal SDA to and from the communication units 20 and 30. The semiconductor circuit 120 of the communication unit 20 receives the clock signal SCL transmitted from the communication unit 10 and transmits and receives the data signal SDA to and from the communication unit 10. The semiconductor circuit 130 of the communication unit 30 receives the clock signal SCL transmitted from the communication unit 10 and transmits and receives the data signal SDA to and from the communication unit 10. In a case where the communication system 1 does not perform communication, the communication unit 10 couples the clock terminal TC1 to the power line that supplies the power supply voltage VDD, by turning on the switch 113. Then, by turning on the switch 125, the communication unit 20 couples the clock terminal TC2 to the one end of the capacitor 21. In the communication system 1, the capacitor 21 is thus charged during a period in which communication is not performed.

(Detailed Operation)

Next, the operation of the communication system 1 will be described in detail. First, a case where the communication unit 10 transmits data to the communication units 20 and 30 (Case C1) will be described. Then, thereafter, a case where the communication unit 20 transmits data to the communication unit 10 (Case C2) and a case where the communication unit 30 transmits data to the communication unit 10 (Case C3) will be described.

(Case C1)

FIG. 2 illustrates an exemplary operation of the communication system 1 in a case where the communication unit 10 transmits data to the communication units 20 and 30 (Case C1), in which part (A) indicates a waveform of the clock signal SCL, part (B) indicates a waveform of the data signal SDA, part (C) indicates a waveform of the control signal CTL1, and part (D) indicates a waveform of the control signal CTL2. In this example, in a case where the level of the control signal CTL1 is high, the switch 113 of the communication unit 10 couples the clock terminal TC1 to the power line that supplies the power supply voltage VDD, and in a case where the level of the control signal CTL1 is low, the switch 113 of the communication unit 10 couples the clock terminal TC1 to the other end of the resistor 112. Furthermore, in a case where the level of the control signal CTL2 is high, the switch 125 of the communication unit 20 couples the clock terminal TC2 to the one end of the capacitor 21.

During a period, before a timing t1, in which the communication system 1 is not performing communication (a communication stop period P1), both the clock signal SCL and the data signal SDA maintain the high level ((A) and (B) in FIG. 2). Specifically, during the communication stop period P1, because the level of the control signal CTL1 is high, the clock signal line CLL is coupled to the power line that supplies the power supply voltage VDD, and because the switch 111 of the communication unit 10 is in the off state, the clock signal SCL maintains the high level. Furthermore, during the communication stop period P1, the data signal line DAL is pulled up by using the resistor 11, and the switch 115 of the communication unit 10, the switch 123 of the communication unit 20, and the switch 133 of the communication unit 30 are all in the off state. Therefore, the data signal SDA maintains the high level. Furthermore, during the communication stop period P1, the switch 125 of the communication unit 20 is in the on state. Thus, in the communication system 1, the capacitor 21 is charged during the communication stop period P1.

FIG. 3 illustrates an exemplary operation of the communication system 1 during the communication stop period P1. During the communication stop period P1, the power supply voltage VDD is directly supplied to the clock signal line CLL via the switch 113 of the communication unit 10. Furthermore, in the communication unit 20, the switch 125 is in the on state. This allows, in the communication system 1, a charging current I to flow through the switch 113, the clock terminal TC1, the clock signal line CLL, the clock terminal TC2, the switch 125, and the capacitor 21 in this order from the power line supplied with the power supply voltage VDD. The capacitor 21 is charged thus.

Then, at the timing t1, the communication controller 118 of the communication unit 10 changes the level of the control signal CTL1 from the high level to the low level ((C) in FIG. 2). By this operation, in the communication unit 10, the clock terminal TC1 is coupled to the other end of the resistor 112, and the clock signal line CLL is pulled up by using the resistor 112.

Furthermore, at the timing t1, the communication unit 10 changes the level of the data signal SDA from the high level to the low level ((B) in FIG. 2). Upon this transition of the data signal SDA, the communication stop period P1 ends in the communication system 1. In the communication system 1, in this way, an operation for falling the data signal SDA in a period in which the level of the clock signal SCL is high (a start operation START) functions as a communication start notification to the slave device.

The communication unit 20 detects the start operation START on the basis of the clock signal SCL and the data signal SDA. The communication controller 128 of the communication unit 20 thus recognizes that the communication system 1 starts to perform communication. Then, at a timing t2, the communication controller 128 changes the level of the control signal CTL2 from the high level to the low level. This turns the switch 125 into the off state, and the charge to the capacitor 21 is stopped.

Similarly, the communication unit 30 detects the start operation START on the basis of the clock signal SCL and the data signal SDA. The communication controller 138 of the communication unit 30 thus recognizes that the communication system 1 starts to perform communication.

Then, at a timing t3, the communication unit 10 starts a toggle operation of the clock signal SCL to thereby start to generate the clock signal SCL ((A) in FIG. 2). This starts a communication period P2.

Then, at a timing t4 after the level of the clock signal SCL has been changed from the high level to the low level for the first time, the communication unit 10 starts to transmit data DT by using the data signal SDA ((B) in FIG. 2). The communication unit 10 generates the data signal SDA to allow the data signal SDA to transition in a period in which the level of the clock signal SCL is low and not to allow the data signal SDA to transition in a period in which the level of the clock signal SCL is high. By receiving the clock signal SCL and the data signal SDA, the communication units 20 and 30 receive the data DT transmitted from the communication unit 10.

Then, at a timing t5, the communication unit 10 completes the transmission of the data DT and sets the data signal SDA to the low level ((B) in FIG. 2).

Then, at a timing t6, the communication unit 10 changes the level of the clock signal SCL from the low level to the high level and ends the toggle operation ((A) in FIG. 2). The communication period P2 thus ends.

Next, at a timing t7, the communication controller 118 of the communication unit 10 changes the level of the control signal CTL1 from the low level to the high level ((C) in FIG. 2). By this operation, in the communication unit 10, the clock terminal TC1 is coupled to the power line that supplies the power supply voltage VDD. As a result, the power supply voltage VDD is directly supplied to the clock signal line CLL via the switch 113.

Furthermore, at the timing t7, the communication unit 10 changes the level of the data signal SDA from the low level to the high level ((B) in FIG. 2). This transition of the data signal SDA starts the communication stop period P1 in the communication system 1. In this way, in the communication system 1, an operation for rising the data signal SDA in a period in which the level of the clock signal SCL is high (a stop operation STOP) functions as a communication end notification to the slave device.

The communication unit 20 detects the stop operation STOP on the basis of the clock signal SCL and the data signal SDA. The communication controller 128 of the communication unit 20 thus recognizes that the communication system 1 ends communication. Then, at a timing t8, the communication controller 128 changes the level of the control signal CTL2 from the low level to the high level. By this operation, the switch 125 is turned on, and the charge to the capacitor 21 is started.

Similarly, the communication unit 30 detects the start operation START on the basis of the clock signal SCL and the data signal SDA. The communication controller 138 of the communication unit 30 thus recognizes that the communication system 1 ends communication.
(Case C2)

As described above, in the communication system 1, the communication unit 10 transmits the data DT to the communication units 20 and 30. It is possible for the data DT to include, for example, control information that specifies which device is to transmit data next and control information that specifies what information is to be transmitted next. In a case where the data DT includes the control information that specifies that the communication unit 20 is to transmit data (data DT2) next, it is possible for the communication unit 20 to transmit the data DT2 to the communication unit 10. Hereinafter, an operation in a case where the communication unit 20 transmits data to the communication unit 10 (Case C2) will be described in detail with reference to FIG. 2.

First, at the timing t1, the communication controller 118 of the communication unit 10 changes the level of the control signal CTL1 from the high level to the lode level ((C) in FIG. 2). By this operation, in the communication unit 10, the clock terminal TC1 is coupled to the other end of the resistor 112, and the clock signal line CLL is pulled up by using the resistor 112. Furthermore, at the timing t1, the communication unit 10 changes the level of the data signal SDA from the high level to the low level ((B) in FIG. 2).

The communication unit 20 detects the start operation START on the basis of the clock signal SCL and the data signal SDA. The communication controller 128 of the communication unit 20 thus recognizes that the communication system 1 starts to perform communication. Then, at the timing t2, the communication controller 128 changes the level of the control signal CTL2 from the high level to the low level. By this operation, the switch 125 is turned off, and the charge to the capacitor 21 is stopped.

Then, at the timing t3, the communication unit 10 starts the toggle operation of the clock signal SCL to thereby start to generate the clock signal SCL ((A) in FIG. 2). Furthermore, the communication unit 10 turns off the switch 115, and the communication unit 20 outputs the low-level data signal SDA.

Next, at the timing t4 after the level of the clock signal SCL has been changed from the high level to the low level for the first time, the communication unit 20 starts to transmit the data DT2 by using the data signal SDA ((B) in FIG. 2). The data DT2 is fixed-length data. By receiving the clock signal SCL and the data signal SDA, the communication unit 10 receives the data DT2 transmitted from the communication unit 20.

Then, at the timing t5, the communication unit 20 completes the transmission of the data DT2 and sets the data signal SDA to the low level ((B) in FIG. 2).

Then, at the timing t6, the communication unit 10 changes the level of the clock signal SCL from the low level to the high level and ends the toggle operation ((A) in FIG. 2). Specifically, because the data DT2 is fixed-length data the communication unit 10 performs a predetermined number of times of toggle operations. Furthermore, the communication unit 20 turns off the switch 123, and the communication unit 10 outputs the low-level data signal SDA.

Next, at the timing t7, the communication controller 118 of the communication unit 10 changes the level of the control signal CTL1 from the low level to the high level ((C) in FIG. 2). By this operation, in the communication unit 10, the clock terminal TC1 is coupled to the power line that supplies the power supply voltage VDD, and the power supply voltage VDD is directly supplied to the clock terminal TC1 via the switch 113.

Furthermore, at the timing t7, the communication unit 10 changes the level of the data signal SDA from the low level to the high level ((B) in FIG. 2).

The communication unit 20 detects the stop operation STOP on the basis of the clock signal SCL and the data signal SDA. The communication controller 128 of the communication unit 20 thus recognizes that the communication system 1 ends communication. Then, at the timing t8, the communication controller 128 changes the level of the control signal CTL2 from the low level to the high level on the basis of the stop operation STOP. By this operation, the switch 125 is turned on, and the charge to the capacitor 21 is started.
(Case C3)

In a case where the data DT transmitted to the communication units 20 and 30 by the communication unit 10 includes control information that specifies that the communication unit 30 is to transmit data (data DT3) next, it is possible for the communication unit 30 to transmit the data DT3 to the communication unit 10. Hereinafter, a case where the communication unit 30 transmits data to the communication unit 10 (Case C3) will be described in detail with reference to FIG. 2.

First, at the timing t1, the communication controller 118 of the communication unit 10 changes the level of the control signal CTL1 from the high level to the low level ((C) in FIG. 2). By this operation, in the communication unit 10, the clock terminal TC1 is coupled to the other end of the resistor 112, and the clock signal line CLL is pulled up by using the resistor 112. Furthermore, at the timing t1, the communication unit 10 changes the level of the data signal SDA from the high level to the low level ((B) in FIG. 2).

The communication unit 30 detects the start operation START on the basis of the clock signal SCL and the data signal SDA. The communication controller 138 of the communication unit 30 thus recognizes that the communication system 1 starts to perform communication.

Similarly, the communication unit 20 detects the start operation START on the basis of the clock signal SCL and the data signal SDA. The communication controller 128 of the communication unit 20 thus recognizes that the communication system I starts to perform communication. Then, at the timing t2, the communication controller 128 changes the level of the control signal CTL2 from the high level to the low level. By this operation, the switch 125 is turned off, and the charge to the capacitor 21 is stopped.

Then, at the timing t3, the communication unit 10 starts the toggle operation of the clock signal SCL to thereby start to generate the clock signal SCL ((A) in FIG. 2). Furthermore, the communication unit 10 turns off the switch 115, and the communication unit 30 outputs the low-level data signal SDA.

Next, at the timing t4 after the level of the clock signal SCL has been changed from the high level to the low level for the first time, the communication unit 30 starts to transmit the data DT3 by using the data signal SDA ((B) in FIG. 2). The data DT3 is fixed-length data. By receiving the clock signal SCL and the data signal SDA, the communication unit 10 receives the data DT3 transmitted from the communication unit 30.

Then, at the timing t5, the communication unit 30 completes the transmission of the data DT3 and sets the data signal SDA to the low level ((B) in FIG. 2).

Then, at the timing t6, the communication unit 10 changes the level of clock signal SCL from the low level to the high level and ends the toggle operation ((A) in FIG. 2). Furthermore, the communication unit 30 turns off the switch 133, and the communication unit 10 outputs the low-level data signal SDA.

Next, at the timing t7, the communication controller 118 of the communication unit 10 changes the level of the control signal CTL1 from the low level to the high level ((C) in FIG. 2). By this operation, in the communication unit 10, the clock terminal TC1 is coupled to the power line that supplies the power supply voltage VDD, and the power supply voltage VDD is directly supplied to the clock terminal TC1 via the switch 113.

Furthermore, at the timing t7, the communication unit 10 changes the level of the data signal SDA from the low level to the high level ((B) in FIG. 2).

The communication unit 30 detects the stop operation STOP on the basis of the clock signal SCL and the data signal SDA. The communication controller 138 of the communication unit 30 thus recognizes that the communication system 1 ends communication.

Similarly, the communication unit 20 detects the stop operation STOP on the basis of the clock signal SCL and the data signal SDA. The communication controller 128 of the communication unit 20 thus recognizes that the communication system 1 ends communication. Then, at the timing t8, the communication controller 128 changes the level of the control signal CTL2 from the low level to the high level on the basis of the stop operation STOP. By this operation, the switch 125 is turned on, and the charge to the capacitor 21 is started.

As described above, in the communication system 1, the switch 125 and the capacitor 21 are provided in the communication unit 20 and, during a certain period within a period other than the communication period P2, the clock signal line CLL is coupled to the capacitor 21 by turning on the switch 125. This makes it possible for the communication unit 20 to charge the capacitor 21 on the basis of the power supply voltage VDD in the communication unit 10 and to use a voltage at the one end of the capacitor 21 as the power supply voltage VDD2. As a result, it is possible to supply the power supply voltage VDD via the clock signal line CLL in the communication system 1 and to omit a power supply wiring line from the communication unit 10 to the communication unit 20. Therefore, it is possible to reduce the number of wiring lines.

Specifically, for example, in a case where wiring lines between the two communication units include four wiring lines, i.e., the clock signal line CLL, the data signal line DAL, the power supply wiring line, and a ground wiring line, the number of wiring lines is large. Therefore, there is a possibility of an increase in cost. Furthermore, a cable including the wiring lines becomes thicker as the number of wiring lines is larger, and accordingly, there is a possibility that a degree of freedom in disposing the communication units is reduced. In particular, in a case where such communication units are applied to, for example, a wearable apparatus that performs biological sensing and the communication units are disposed on various portions of a human body, an increase in the number of wiring lines increases weight, and an increase in thickness of the cable makes it less easy for the human body to move. As a result, wearability of the wearable apparatus deteriorates.

On the other hand, in the communication system 1, because the power supply voltage VDD is supplied via the clock signal line CLL, it is possible to reduce the number of wiring lines. Therefore, it is possible to reduce cost and enhance the degree of freedom in disposing the communication units. For example, in a case where the communication system 1 is applied to a wearable apparatus and the communication units are disposed on various portions of the human body, it is possible to reduce weight because a reduction in the number of wiring lines is possible, and it is possible for the human body to move easily because thinning of the cable is possible. As a result, it is possible to enhance the wearability of the wearable apparatus.

Furthermore, in the communication system 1, the communication unit 20 detects the start operation START and the stop operation STOP on the basis of the clock signal SCL and the data signal SDA, and turns on or off the switch 125 on the basis of the detection result. This makes it possible to stably charge the capacitor 21. Specifically, before the start operation START, and after the stop operation STOP, the communication unit 10 supplies the power supply voltage VDD to the clock signal line CLL. Therefore, the communication unit 20 turns on the switch 125 on the basis of the stop operation STOP, and turns off the switch 125 on the basis of the start operation START, which makes it possible to stably charge the capacitor 21.

Furthermore, in the communication system 1, the switch 113 is provided in the communication unit 10 and in a case of charging the capacitor 21, the clock terminal TC1 is directly coupled to the power line that supplies the power supply voltage VDD. This makes it possible to shorten a charge time. Specifically, for example, in a case where the switch 113 is not provided in the communication unit 10 and the clock terminal TC1 is coupled to the other end of the resistor 112, the charging current I flows via the resistor 112. Therefore, a current value of the charging current I is limited, and the charge time increases. On the other hand, in the communication system 1, in the case of charging the capacitor 21, the clock terminal TC1 is directly coupled to the power line that supplies the power supply voltage VDD, which makes it possible to reduce a resistance value in a path through which the charging current I flows. Therefore, it is possible to shorten the charge time and to efficiently perform charge.

[Effect]

As described above, in the present embodiment, the switch 125 and the capacitor are provided in the communication unit 20 and, during a certain period within a period other than the communication period, the clock signal line is coupled to the capacitor by turning on the switch 125. This makes it possible to reduce the number of wiring lines.

In the present embodiment, the communication unit 20 detects the start operation and the stop operation on the basis of the clock signal and the data signal, and turns on or off the switch 125 on the basis of the detection result. Therefore, it is possible to stably charge the capacitor.

In the present embodiment, the switch 113 is provided in the communication unit 10 and, in the case of charging the capacitor, the clock terminal TC1 is directly coupled to the power line that supplies the power supply voltage VDD. Therefore, it is possible to shorten the charge time.

MODIFICATION EXAMPLE 1

In the above-described embodiment, as illustrated in FIG. 2, the communication controller 118 changes the level of the control signal CTL1 from the high level to the low level at the timing t1. However, this is non-limiting. Instead of this, for example, the timing may be a timing before the timing t1 or a timing after the timing t1 and before the clock signal SCL falls for the first time. Furthermore, the communication controller 118 changes the level of the control signal CTL1 from the low level to the high level at the timing t5. However, this is non-limiting. Instead of this, for example, the timing may be a timing before the timing t5 and after the latest timing at which the clock signal SCL rises, or a timing after the timing t5.

MODIFICATION EXAMPLE 2

In the above-described embodiment, in the communication unit 10, the resistor 112 that functions as a pull-up resistor of the clock signal line CLL is provided in the semiconductor circuit 110. However, this is non-limiting. Instead of this, for example, as in a communication system 1A illustrated in FIG. 4, a resistor may be provided outside a semiconductor circuit. The communication system 1A includes a communication unit 10A. The communication unit 10A includes a resistor 12A, a switch 13A, and a semiconductor circuit 110A. The resistor 12A functions as the pull-up resistor of the clock signal line CLL and corresponds to the resistor 112 according to the above-described embodiment. One end of the resistor 12A is supplied with a power supply voltage VDD, and another end thereof may be coupled to a clock terminal TC1 via the switch 13A. The resistor 12A includes, for example, a chip resistor. The switch 13A selectively couples the clock terminal TC1 to the other end of the resistor 12A or a power line that supplies the power supply voltage VDD on the basis of the control signal CTL1 supplied from the communication controller 118. The switch 13A corresponds to the switch 113 according to the above-described embodiment. The semiconductor circuit 110A includes the switch 111, the communication circuit 114, the communication controller 118, and the processor 119. The semiconductor circuit 110A is similar to the semiconductor circuit 110 according to the above-described embodiment, except that the resistor 112 and the switch 113 are omitted.

Furthermore, in the communication unit 10A according to the above-described modification example, the communication controller 118 of the semiconductor circuit 110A generates the control signal CTL1. However, this is non-limiting. Instead of this, for example, as in a communication system 1B illustrated in FIG. 5, a control circuit other than the semiconductor circuit may generate the control signal CTL1. The communication system 1B includes a communication unit 10B. The communication unit 10B includes a control circuit 14B and a semiconductor circuit 110B. The control circuit 14B generates the control signal CTL1 on the basis of the clock signal SCL and the data signal SDA. Specifically, the control circuit 14B detects the start operation START and the stop operation STOP on the basis of the clock signal SCL and the data signal SDA. Upon detecting the start operation START, the control circuit 14B couples the clock terminal TC1 to the other end of the resistor 12A by supplying the control signal CTL1 to the switch 13A. Furthermore, upon detecting the stop operation STOP, the control circuit 14B couples the clock terminal TC1 to the power line that supplies the power supply voltage VDD by supplying the control signal CTL1 to the switch 13A. The semiconductor circuit 110B includes a communication controller 118B. The communication controller 118B is similar to the communication controller 118 according to the above-described embodiment, except the function for generating the control signal CTL1 is omitted.

MODIFICATION EXAMPLE 3

In the above-described embodiment, the switch 113 is inserted between the other end of the resistor 112 that functions as the pull-up resistor of the clock signal line CLL and the clock terminal TC1. However, this is non-limiting. Instead of this, for example, as in a communication system 1C illustrated in FIG. 6, the other end of the resistor may be coupled to the clock terminal TC1. The communication system 1C includes a communication unit 10C. The communication unit 10C includes a resistor 12A and a semiconductor circuit 110C. One end of the resistor 12A is supplied with the power supply voltage VDD, and another end thereof is coupled to the clock terminal TC1. The semiconductor circuit 110C includes a switch 113C. One end of the switch 113C is supplied with the power supply voltage VDD, and another end thereof is coupled to the clock terminal TC1. By turning on the switch 113C, the semiconductor circuit 110C directly supplies the power supply voltage VDD to the clock signal line CLL. Furthermore, by turning off the switch 113C, it is possible for the semiconductor circuit 110C to pull up the clock signal line CLL by using the resistor 12A.

MODIFICATION EXAMPLE 4

In the above-described embodiment, in the communication unit 20, the communication controller 128 of the semiconductor circuit 120 generates the control signal CTL2. However, this is non-limiting. Instead of this, for example, as in a communication system 1D illustrated in FIG. 7, a control circuit other than the semiconductor circuit may generate the control signal CTL2. The communication system 1D includes a communication unit 20D. The communication unit 20D includes a switch 22D, a control circuit 23D, and a semiconductor circuit 120D. The switch 22D couples the clock terminal TC2 to the capacitor 21 on the basis of the control signal CTL2 supplied from the control circuit 23D. One end of the switch 22D is coupled to the clock terminal TC2, and another end thereof is coupled to the one end of the capacitor 21. The control circuit 23D generates the control signal CTL2 on the basis of the clock signal SCL and the data signal SDA. Specifically, the control circuit 23D detects the start operation START and the stop operation STOP on the basis of the clock signal SCL and the data signal SDA. Upon detecting the start operation START, the control circuit 23D turns off the switch 22D by supplying the control signal CTL2 to the switch 22D. Furthermore, upon detecting the stop operation STOP, the control circuit 23D turns on the switch 22D by supplying the control signal CTL1 to the switch 13A. The semiconductor circuit 120D includes a communication controller 128D. The communication controller 128D is similar to the communication controller 128 according to the above-described embodiment, except that the function for generating the control signal CTL2 is omitted.

MODIFICATION EXAMPLE 5

In the above-described embodiment, the communication unit 30 operates on the basis of electric power supplied from the communication unit 20. However, this is non-limiting. Instead of this, for example, as in a communication system 1E illustrated in FIG. 8, a communication unit may operate on the basis of electric power supplied from the communication unit 10 via the clock signal line CLL, similarly to the communication unit 20. The communication system 1E includes a communication unit 30E. The communication unit 30E includes a semiconductor circuit 130E and a capacitor 31E. The semiconductor circuit 130E includes a switch 135E and a communication controller 138E. The communication unit 30E has a similar configuration to the communication unit 20. Similarly to the communication controller 128 of the communication unit 20, the communication controller 138E turns off the switch 135E by supplying a control signal CTL3 to the switch 135E in a case where the communication system 1E performs communication, and turns on the switch 135E by supplying the control signal CTL3 to the switch 135E in a case where the communication system 1 does not perform communication. A voltage at one end of the capacitor 31E is supplied to the semiconductor circuit 130E as a power supply voltage VDD3.

OTHER MODIFICATION EXAMPLE

For example, it is desirable that the switch 125 of the communication unit 20 be a normally-on-type switch. With this switch, for example, even in a case where a charge amount of the capacitor 21 is insufficient and the semiconductor circuit 120 is unable to operate, the switch 125 is turned on and thus the capacitor 21 is charged.

Furthermore, for example, the semiconductor circuit 120 may detect a voltage level of the power supply voltage VDD2. This allows the semiconductor circuit 120 to detect a charge level of the capacitor 21. Moreover, in a case where the charge level of the capacitor 21 is lower than a predetermined level, the semiconductor circuit 120 may forcibly turn on the switch 125. This makes it possible to maintain the charge amount of the capacitor 21.

The present technology has been described above with reference to the embodiment and some modification examples. However, the present technology is not limited to the embodiment or the like but may be modified in a variety of ways.

For example, in the above-described embodiment or the like, the two slave devices (the communication units 20 and 30) are provided; however, this is non-limiting. A single slave device may be provided, or three or more slave devices may be provided.

For example, in the above-described embodiment or the like, the capacitor 21 is provided in the communication unit 20; however, this is non-limiting. Instead of this, for example, a rechargeable battery may be provided.

Note that the effects described herein are merely exemplary and non-limiting. Any other effect may also be achieved.

Note that it is possible for the present technology to have the following configurations.

(1)

A communication system including:

a first communication unit including a first terminal, a transmission circuit configured to transmit a clock signal via the first terminal, a first resistor inserted into a path between the first terminal and a power supply, a first switch configured to couple the power supply and the first terminal to each other by being turned on, and a first controller configured to control an operation of the first switch; and a second communication unit including a second terminal coupled to the first terminal of the first communication unit via a first wiring line, a reception circuit configured to receive the clock signal via the second terminal, a power storage device, a second switch configured to couple the second terminal and the power storage device to each other by being turned on, and a second controller configured to control an operation of the second switch, the second communication unit being configured to operate by supply of a voltage of the power storage device as a power supply voltage.

(2)

The communication system according to (1), in which the first communication unit further includes a third terminal, a first communication circuit configured to transmit and receive a data signal via the third terminal, and a second resistor inserted into a path between the third terminal and the power supply, the second communication unit further includes a fourth terminal coupled to the third terminal of the first communication unit via a second wiring line, and a second communication circuit configured to transmit and receive the data signal via the fourth terminal, and the first controller is configured to turn off the first switch during a communication period in which the first communication circuit transmits and receives data information included in the data signal and to turn on the first switch during a first period within a period other than the communication period.

(3)

The communication system according to (2), in which the first controller is configured to change a state of the first switch from an on state to an off state at a first timing before the transmission circuit starts to transmit the clock signal.

(4)

The communication system according to (2) or (3), in which
the first controller is configured to change a state of the first switch from an off state to an on state at a second timing after the transmission circuit completes a transmission of the clock signal.

(5)
The communication system according to (2), in which
the first communication circuit makes the data signal transition before the transmission circuit starts to transmit the clock signal, and
the first controller changes a state of the first switch from an on state to an off state on a basis of the data signal and the clock signal before the transmission circuit starts to transmit the clock signal.

(6)
The communication system according to (2) or (5), in which
the first communication circuit makes the data signal transition after the transmission circuit completes a transmission of the clock signal, and
the first controller changes a state of the first switch from an off state to an on state on a basis of the data signal and the clock signal after the transmission circuit completes the transmission of the clock signal.

(7)
The communication system according to any one of (2) to (6), in which
the first communication circuit makes the data signal transition before the transmission circuit starts to transmit the clock signal, and
the second controller changes a state of the second switch from an on state to an off state on a basis of the data signal and the clock signal before the transmission circuit starts to transmit the clock signal.

(8)
The communication system according to any one of (2) to (7), in which
the first communication circuit makes the data signal transition after the transmission circuit completes a transmission of the clock signal, and
the second controller changes a state of the second switch from an off state to an on state on a basis of the data signal and the clock signal after the transmission circuit completes the transmission of the clock signal.

(9)
A communication unit including:
a first terminal;
a transmission circuit configured to transmit a clock signal via the first terminal;
a first resistor inserted into a path between the first terminal and a power supply;
a first switch configured to couple the power supply and the first terminal to each other by being turned on; and
a first controller configured to control an operation of the first switch.

The present application claims priority based on Japanese Patent Application No. 2018-002796 filed with the Japan Patent Office on Jan. 11, 2018, the entire content of which is incorporated herein by reference.

It should be understood that those skilled in the art would make various modifications, combinations, sub-combinations, and alterations depending on design requirements and other factors, and they are within the scope of the attached claims or the equivalents thereof.

The invention claimed is:
1. A communication system comprising:
a first communication unit including a first terminal, a transmission circuit configured to transmit a clock signal via the first terminal, a first resistor inserted into a path between the first terminal and a power supply, a first switch configured to couple the power supply and the first terminal to each other by being turned on, and a first controller configured to control an operation of the first switch; and
a second communication unit including a second terminal coupled to the first terminal of the first communication unit via a first wiring line, a reception circuit configured to receive the clock signal via the second terminal and through the first wiring line, a power storage device, a second switch configured to couple the second terminal and the power storage device to each other by being turned on, and a second controller configured to control an operation of the second switch, the second communication unit being configured to operate by supply of a voltage of the power storage device as a power supply voltage,
wherein the first controller is configured to turn off the first switch during a communication period in which the first communication circuit transmits and receives data information included in the data signal and to turn on the first switch during a first period within a period other than the communication period.

2. The communication system according to claim 1, wherein
the first communication unit further includes a third terminal, a first communication circuit configured to transmit and receive a data signal via the third terminal, and a second resistor inserted into a path between the third terminal and the power supply,
the second communication unit further includes a fourth terminal coupled to the third terminal of the first communication unit via a second wiring line, and a second communication circuit configured to transmit and receive the data signal via the fourth terminal.

3. The communication system according to claim 2, wherein the first controller is configured to change a state of the first switch from an on state to an off state at a first timing before the transmission circuit starts to transmit the clock signal.

4. The communication system according to claim 2, wherein the first controller is configured to change a state of the first switch from an off state to an on state at a second timing after the transmission circuit completes a transmission of the clock signal.

5. The communication system according to claim 2, wherein
the first communication circuit makes the data signal transition before the transmission circuit starts to transmit the clock signal, and
the first controller changes a state of the first switch from an on state to an off state on a basis of the data signal and the clock signal before the transmission circuit starts to transmit the clock signal.

6. The communication system according to claim 2, wherein
the first communication circuit makes the data signal transition after the transmission circuit completes a transmission of the clock signal, and
the first controller changes a state of the first switch from an off state to an on state on a basis of the data signal and the clock signal after the transmission circuit completes the transmission of the clock signal.

7. The communication system according to claim 2, wherein
the first communication circuit makes the data signal transition before the transmission circuit starts to transmit the clock signal, and
the second controller changes a state of the second switch from an on state to an off state on a basis of the data signal and the clock signal before the transmission circuit starts to transmit the clock signal.

8. The communication system according to claim 2, wherein
the first communication circuit makes the data signal transition after the transmission circuit completes a transmission of the clock signal, and
the second controller changes a state of the second switch from an off state to an on state on a basis of the data signal and the clock signal after the transmission circuit completes the transmission of the clock signal.

9. A communication unit comprising:
a first terminal and a second terminal;
a transmission circuit configured to transmit a clock signal via the first terminal;
a first resistor inserted into a path between the first terminal and a power supply;
a first switch configured to couple the power supply and the first terminal to each other by being turned on;
a first controller configured to control an operation of the first switch;
a communication circuit configured to transmit and receive a data signal via the second terminal, and a second resistor inserted into a path between the second terminal and the power supply,
wherein the controller is configured to turn off the first switch during a communication period in which the communication circuit transmits and receives data information included in the data signal and to turn on the first switch during a first period within a period other than the communication period.

10. The communication unit according to claim 9, wherein the controller is configured to change a state of the first switch from an on state to an off state at a first timing before the transmission circuit starts to transmit the clock signal.

11. The communication unit according to claim 9, wherein the controller is configured to change a state of the first switch from an off state to an on state at a second timing after the transmission circuit completes a transmission of the clock signal.

12. The communication unit according to claim 9, wherein
the communication circuit makes the data signal transition before the transmission circuit starts to transmit the clock signal, and
the controller changes a state of the first switch from an on state to an off state on a basis of the data signal and the clock signal before the transmission circuit starts to transmit the clock signal.

13. The communication unit according to claim 9, wherein
the communication circuit makes the data signal transition after the transmission circuit completes a transmission of the clock signal, and
the controller changes a state of the first switch from an off state to an on state on a basis of the data signal and the clock signal after the transmission circuit completes the transmission of the clock signal.

* * * * *